UNITED STATES PATENT OFFICE.

JAMES ROBERT PAUL, OF CHARLOTTE, NORTH CAROLINA.

ANTIFREEZE COMPOSITION.

No Drawing.    Application filed February 17, 1927.   Serial No. 169,141.

This invention relates to compositions known as anti-freeze compositions, and more particularly to such compositions adapted to be used in aqueous solution in the cooling systems of internal combustion engines, primarily automobiles.

Many suggestions will be found in the prior art looking to the elimination of the disadvantages of the use of water alone in such circulating cooling systems, particularly during cold weather when such water is likely to freeze and cause serious damage to the mechanical parts constituting such a system. But these prior art suggestions have not come into wide use for a number of reasons, among which may be noted, increased cost of the proposed compositions, fire hazard, corrosibility, etc., depending on the type of composition suggested.

Among the objects and advantages of the present invention, therefore, is the production of a composition that may be used in place of water in such cooling systems, which composition will not corrode or attack metal or non-metal parts made of iron, steel, rubber, etc., which composition will be simple and economical to manufacture, and which may be readily transported at a minimum cost.

Other and further objects and advantages will appear from the more detailed description set forth below, it being understood however, that this more detailed description is given by way of illustration and not by way of limitation, since various changes may be made therein by those skilled in the art without departing from the scope and spirit of this invention.

The materials entering into the composition that has been found particularly desirable for the purposes set forth herein, include an organic acid such as tartaric acid, a salt of thiosulphuric acid such as its common sodium salt, known as "hypo", and another metallic salt such as calcium chloride. The particular compounds specified have been found to make a highly efficacious composition for use in automobile cooling systems.

The following specific example illustrates a desirable composition for such use: Sodium thiosulphate (hypo) ½ lb., calcium chloride, ½ lb., tartaric acid, 1 teaspoonful, water, 1 gallon. The ingredients are desirably pulverized together and then added to the water. If desired however, the ingredients may be added successively to the water or mixed in any other manner.

While the proportions set forth above have been given in order to illustrate the preferred composition, these proportions may be varied. The particular composition is however a desirable one in that when used in automobile cooling systems, not only is there no corrosion of metal parts nor attack of non-metal parts, but it is found that the solution in the proportions indicated will not freeze at any temperatures ordinarily met with during the winter season.

The particular substances mentioned are relatively inexpensive, but equivalent materials may be used if desired. And further, other substances may be added to the stated composition, if desired, although the stated ingredients have been found to be satisfactory without other additions.

For economical shipment, the ingredients other than the water content, may be packaged either in bulk or in cartons designed to hold that quantity of the composition necessary for a stated addition to a given quantity of water, so that the user need merely add the contents of a carton to the required amount of water. When so shipped, it is desirable to use water-proof packages in view of the highly deliquescent properties of calcium chloride.

Having thus set forth my invention, I claim:

1. A composition adapted for use in antifreeze solutions consisting of sodium thiosulphate, ½ lb., calcium chloride, ½ lb., and tartaric acid, 1 teaspoonful.

2. A composition adapted for use in an antifreeze solution comprising substantially equal parts of sodium thiosulphate and calcium chloride, and a relatively small amount of tartaric acid.

3. An antifreeze composition consisting of the liquid formed by the combination of substantially equal parts of sodium thiosulphate and calcium chloride, a relatively small amount of tartaric acid, and water.

4. An antifreeze composition consisting of the liquid formed by the combination of sodium thiosulphate, ½ lb., calcium chloride, ½ lb., tartaric acid, 1 teaspoonful, and water, 1 gallon.

In testimony whereof I affix my signature.

JAMES ROBERT PAUL.